(12) United States Patent
Oosawa

(10) Patent No.: US 8,335,004 B2
(45) Date of Patent: Dec. 18, 2012

(54) PRINTING SYSTEM

(75) Inventor: Takanori Oosawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 803 days.

(21) Appl. No.: 12/457,877

(22) Filed: Jun. 24, 2009

(65) Prior Publication Data

US 2010/0014114 A1   Jan. 21, 2010

(30) Foreign Application Priority Data

Jul. 18, 2008   (JP) .................................. 2008-187161

(51) Int. Cl.
*G06K 15/00* (2006.01)
*G06F 3/12* (2006.01)
(52) U.S. Cl. ..................................... 358/1.15; 358/1.16
(58) Field of Classification Search .................. 358/1.14, 358/1.15, 1.16, 468
See application file for complete search history.

(56) References Cited

U.S. PATENT DOCUMENTS

| | | | | |
|---|---|---|---|---|
| 5,581,668 A | * | 12/1996 | Oida et al. | 358/1.14 |
| 2002/0021902 A1 | * | 2/2002 | Hosoda et al. | 396/429 |
| 2005/0111039 A1 | * | 5/2005 | Yoshida | 358/1.16 |
| 2008/0068649 A1 | * | 3/2008 | Emori | 358/1.15 |

FOREIGN PATENT DOCUMENTS

| | | |
|---|---|---|
| JP | 2000-172474 | 6/2000 |
| JP | 2004-234082 | 8/2004 |
| JP | 2007-028062 | 2/2007 |

* cited by examiner

*Primary Examiner* — Jerome Grant, II
(74) *Attorney, Agent, or Firm* — Kubotera & Associates, LLC

(57) ABSTRACT

A printing system includes a plurality of printing apparatus; a plurality of host devices sharing the printing apparatus; and an administrative server for administrating the printing apparatus and the host devices. In the printing system, the printing apparatus, the host devices, and the administrative server are connected to with each other through a network. The printing apparatus are operated one of a plurality of operation modes. The administrative server instructs the printing apparatus to operate one of the operation modes according to mode setting information.

15 Claims, 14 Drawing Sheets

| Host name | IP address |
|---|---|
| host a | 192.168.11.x |
| host b | 192.168.11.y |
| ⋮ | ⋮ |

FIG. 3

| Printer name | IP address |
|---|---|
| printer a | 192.168.11.xxx |
| printer b | 192.168.11.yyy |
| printer c | 192.168.11.zzz |

FIG. 4

| Operation host name |
|---|
| host a |
| host b |
| ⋮ |

FIG. 5

| Printer name | Power source | Operation mode |
|---|---|---|
| printer a | ON | Printing mode |
| printer b | ON | Printing mode |
| printer c | ON | Printing mode |

FIG. 6(a)

| Printer name | Power source | Operation mode |
|---|---|---|
| printer a | ON | Printing mode |
| printer b | ON | Power save mode |
| printer c | ON | Hibernation mode |

FIG. 6(b)

| Operation host number | Printing mode | Power save mode | Hibernation mode |
|---|---|---|---|
| 0 | | | printer a, printer b, printer c |
| 1~3 | printer a | | printer b, printer c |
| 4~5 | printer a | printer b | printer c |
| 6~10 | printer a | printer b, printer c | |
| 11~20 | printer a, printer b | printer c | |
| 21~ | printer a, printer b, printer c | | |

FIG. 7

| Date/Time | Host name | Printer name |
|---|---|---|
| 03/04 Tue 13:11 | host a | printer a |
| 03/05 Wed 10:51 | host a | printer a |
| 03/05 Wed 11:11 | host b | printer a |
| 03/06 Thu 18:30 | host a | printer b |
| 03/06 Thu 18:41 | host b | printer b |
| ⋮ | ⋮ | ⋮ |

FIG. 11

|     | 0:00 ~ 4:00 | 4:00 ~ 8:00 | 8:00 ~ 12:00 | 12:00 ~ 16:00 | 16:00 ~ 20:00 | 20:00 ~ 24:00 |
|-----|---|---|----|----|----|---|
| Mon | 0 | 1 | 2  | 18 | 9  | 8 |
| Tue | 0 | 0 | 8  | 16 | 10 | 2 |
| Wed | 0 | 3 | 12 | 3  | 2  | 3 |
| Thu | 0 | 0 | 4  | 13 | 16 | 2 |
| Fri | 0 | 0 | 6  | 15 | 10 | 5 |
| Sat | 0 | 0 | 0  | 1  | 3  | 0 |
| Sun | 0 | 0 | 0  | 0  | 0  | 0 |

FIG. 12

| Usage | Printing mode | Power save mode | Hibernation mode |
|---|---|---|---|
| 0~5 | 0 | 1 | 2 |
| 6~10 | 1 | 0 | 2 |
| 11~15 | 1 | 1 | 1 |
| 16~20 | 1 | 2 | 0 |
| 21~30 | 2 | 1 | 0 |
| 31~ | 3 | 0 | 0 |

FIG. 13

PRINTING SYSTEM

BACKGROUND OF THE INVENTION AND RELATED ART STATEMENT

The present invention relates to a printing system in which a plurality of printing apparatus, a plurality of host devices, and an administrative server are connected to with each other through a network. More specifically, the present invention relates to a printing system capable of conserving energy consumption.

Recently, a conventional printing system has been widely used, in which a plurality of printers connected to a plurality of host devices through a network are shared as network printers. In the conventional printing system, after it is detected that all of the host devices sharing one network printer finish operating, the one network printer is turned off (refer to Patent Reference).

Patent Reference: Japanese Patent Publication No. 2000-172474

In the conventional printing system described above, instead of one network printer, when a plurality of printing apparatus is connected to a plurality of host devices through a network and shared as network printers, all of the printing apparatus keep turning on if just one of the host devices is operating. In other words, only even when it is necessary to use just one of the printing apparatus, it is necessary to turn on other printing apparatus, thereby wasting energy.

In view of the problems described above, an object of the present invention is to provide a printing system capable of conserving energy consumption.

Further objects and advantages of the invention will be apparent from the following description of the invention.

SUMMARY OF THE INVENTION

According to a first aspect of the present invention, a printing system includes a plurality of printing apparatus; a plurality of host devices sharing the printing apparatus; and an administrative server for administrating the printing apparatus and the host-devices. In the printing system, the printing apparatus, the host devices, and the administrative server are connected to with each other through a network. The printing apparatus operate one of a plurality of operation modes. The administrative server instructs the printing apparatus to operate one of the operation modes according to mode setting information.

In the printing system according to the present invention, it is arranged to set the operation mode of the printing apparatus according to a current operation state of the host devices. Accordingly, it is possible to switch the operation mode of each of the printing apparatus according to the operation state of the host devices, thereby conserving energy consumption and improving power saving.

BRIEF DESCRIPTION OF THE DRAWINGS

FIG. 3 is a schematic view showing a configuration of a host registration information storage unit of the printing system according to the first embodiment of the present invention;

FIG. 4 is a schematic view showing a configuration of a printer registration information storage unit of the printing system according to the first embodiment of the present invention;

FIG. 5 is a schematic view showing a configuration of a host operation information table of the printing system according to the first embodiment of the present invention;

FIGS. 6(a) and 6(b) are schematic views showing configurations of an operation mode information table of the printing system according to the first embodiment of the present invention;

FIG. 7 is a schematic view showing a configuration of a mode setting information storage unit of the printing system according to the first embodiment of the present invention;

FIG. 11 is a schematic view showing a configuration of a history storage unit of the printing system according to the second embodiment of the present invention;

FIG. 12 is a schematic view showing a configuration of a usage storage unit of the printing system according to the second embodiment of the present invention;

FIG. 13 is a schematic view showing a configuration of a mode setting information storage unit of the printing system according to the second embodiment of the present invention;

DETAILED DESCRIPTION OF THE PREFERRED EMBODIMENTS

Hereunder, embodiments of the present invention will be described in detail with reference to the accompanying drawings.

First Embodiment

Figure 2:
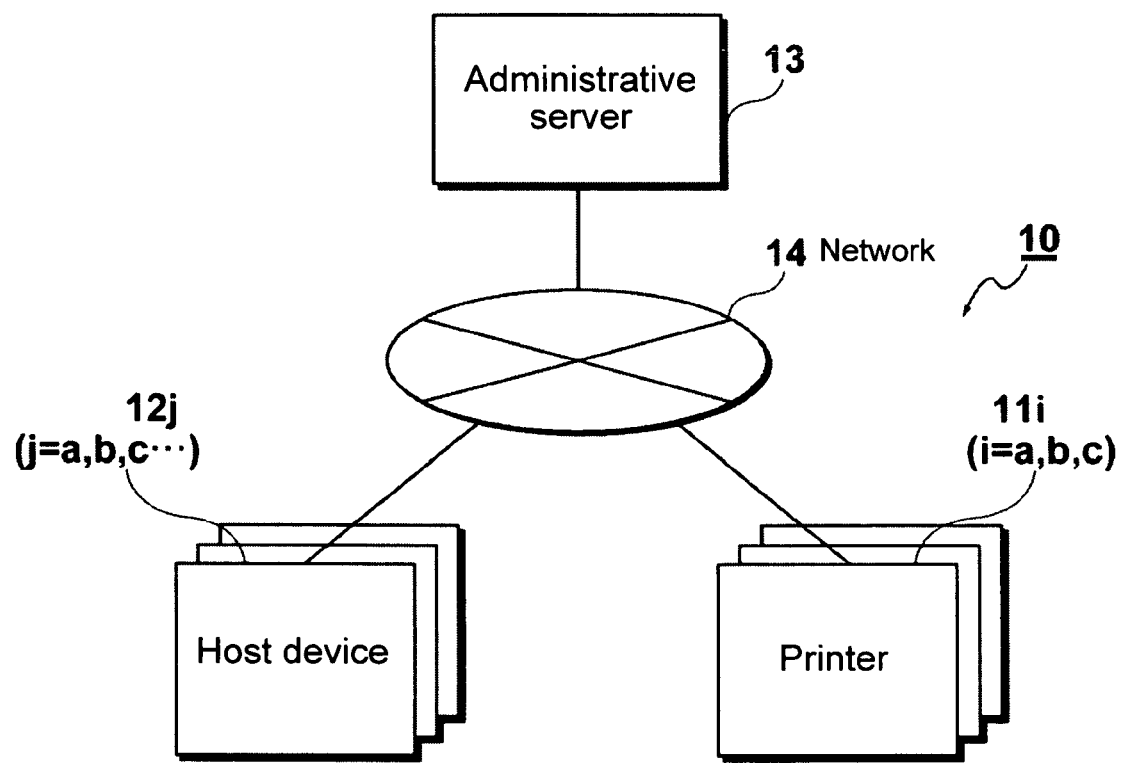
FIG. 2 is a block showing the printing system according to the first embodiment of the present invention.

A first embodiment of the present invention will be explained. FIG. 2 is a block showing a printing system 10 according to the first embodiment of the present invention. As shown in FIG. 2, the printing system 10 includes a plurality of printers 11$i$; a plurality of host devices 12$j$; and an administrative server 13. The printers 11$i$, the host devices 12$j$, and the administrative server 13 are connected to with each other through a network 14.

In the embodiment, the printing system 10 includes three printers 11$a$, 11$b$, and 11$c$; and an n number of host devices 12$j$ (j=a, b, c, . . . ). Each of the host devices 12$j$ shares the three printers 11$a$, 11$b$, and 11$c$ for performing a printing operation on each of the printers 11$a$, 11$b$, and 11$c$ through the administrative server 13. When it is necessary to differentiate each of the printers 11 and the host devices 12, characters a, b, c, . . . j are attached to the reference numerals. When the printers 11 and the host devices 12 are collectively referred to, only the reference numerals are designated.

Figure 1:
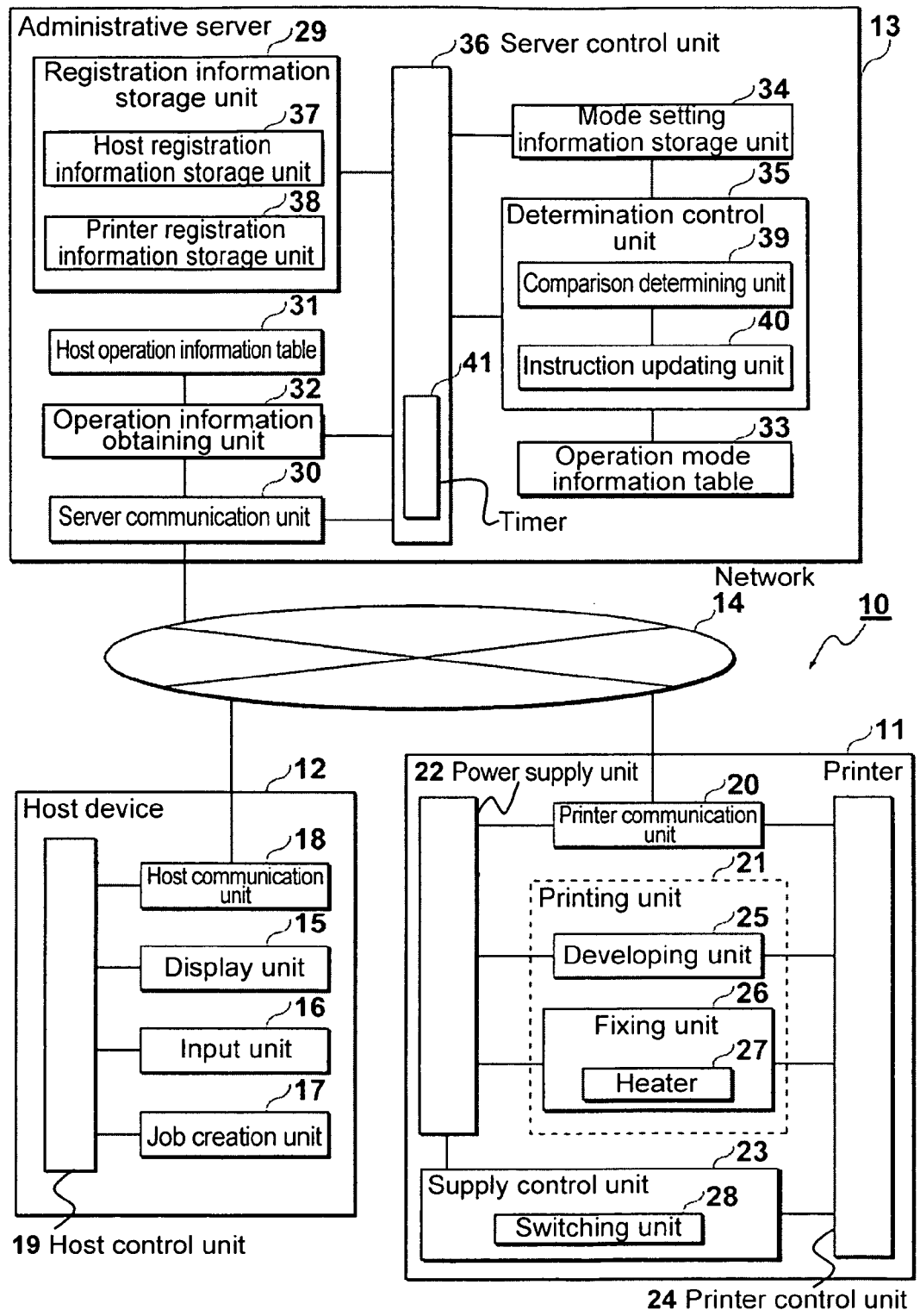
FIG. 1 is a block diagram showing a configuration of a printing system according to a first embodiment of the present invention.

FIG. 1 is a block diagram showing a configuration of the printing system 10 according to the first embodiment of the present invention. Each of the host devices 12j is formed of, for example, a personal computer, and has a host name "host j" as device identification information. As shown in FIG. 1, each of the host devices 12 includes a display unit 15; an input unit 16; a job creation unit 17; a host communication unit 18; and a host control unit 19.

In the embodiment, the display unit 15 is formed of, for example, a display having a function of displaying various screens. The input unit 16 is formed of, for example, a mouse and a keyboard for inputting and selecting various types of information. The job creating unit 17 has a function of creating a print job for the printing operation. The host communication unit 18 is an interface unit for communication through the network 14 to send and receive data and a signal with the administrative server 13.

More specifically, the host communication unit 18 sends the print job to the administrative server 13. When the host communication unit 18 receives a ping request signal (described later) from the administrative server 13, the host communication unit 18 sends a ping response signal indicating that the host devices 12 are operating to the administrative server 13. At this moment, the host communication unit 18 sends an IP address of the host device 12 along with the ping response signal. The host control unit 19 has a function of controlling the display unit 15, the input unit 16, the job creation unit 17, and the host communication unit 18.

In the embodiment, the host devices 12 share the printers 11, and the printers 11 operate one of three operation modes. More specifically, when the printers 11 are turned on, the printers 11 operate one of a printing mode, a power save mode, and a hibernation mode. The three operation modes will be described later.

In the embodiment, the printer 11i as the printing apparatus has a printer name "printer i" as apparatus identification information. As shown in FIG. 1, each of the printers 11 includes a printer communication unit 20; a printing unit 21; a power supply unit 22; a supply control unit 23; and a printer control unit 24.

In the embodiment, the printer communication unit 20 is an interface unit for communication through the network 14 to send and receive data and a signal with the administrative server 13. More specifically, the printer communication unit 20 receives the print job from the administrative server 13. Further, the printer communication unit 20 receives a switching instruction from the administrative server 13 for switching an operation mode.

The printing unit 21 is a processing unit for performing the printing operation according to the print job, and includes a developing unit 25 and a fixing unit 26 as shown in FIG. 1.

The developing unit 25 includes a photosensitive drum, a developing roller, a transfer roller, and the likes (not shown) for forming a toner image on a surface of the photosensitive drum and transferring the toner image to a sheet as a recording medium. The fixing unit 26 includes a heater 27 for heating and pressing the sheet with the toner image formed thereon, so that the toner image is fixed to the sheet.

In the embodiment, the power supply unit 22 supplies power to the printer communication unit 20 and the printing unit 21. The supply control unit 23 includes a switching unit 28 for controlling power supplied to the power supply unit 22. The switching unit 28 switches the operation mode according to a switching instruction from the printer control unit 24. The printer control unit 24 has a function of controlling the printer communication unit 20, the printing unit 21, the power supply unit 22, and the supply control unit 23.

As described above, in the embodiment, the printers 11 operate one of the three operation mode, i.e., the printing mode, the power save mode, and the hibernation mode. The printing mode corresponds to a state that the printing operation can be performed immediately (for example, a state that the fixing unit is maintained at a printable temperature). In the printing mode, when the printers 11 receive the print job from the administrative server 13, the printers 11 immediately start the printing operation according to the print job.

In the power save mode, power supply to a unit with large power consumption (for example, the fixing unit, etc.) is terminated or restricted. Accordingly, as compared with the printing mode, power consumption is conserved.

In the embodiment, when the printers 11 are set in the power save mode, the power supply unit 22 supplies power to the units except the heater 27 of the fixing unit 26, i.e., the developing unit 25 and the printer communication unit 20. When an instruction for terminating the power save mode is received, the power supply unit 22 starts supplying power to the heater 27. Accordingly, the printers 11 switch from the power save mode to the printing mode. In this case, the printers 11 start the printing operation within a period of time corresponding to a heating time necessary for the heater 27 to heat the fixing unit 26 to a specific fixing temperature.

In the hibernation mode, power supply is terminated to each of the units except the printer communication unit 20. In the hibernation mode, the printers 11 are only capable of receiving the switching instruction signal from the administrative server 13 with the printer communication unit 20.

In the embodiment, the administrative server 13 is provided for administering each of the printers 11 and the host devices 12. As shown in FIG. 1, the administrative server 13 includes a registration information storage unit 29; a server communication unit 30; a host operation information table 31; an operation information obtaining unit 32; an operation mode information table 33; a mode setting information storage unit 34; a determination control unit 35; and a server control unit 36.

In the embodiment, the registration information storage unit 29 registers and stores in advance registration information regarding each of the printers 11 administered with the administrative server 13, i.e., the printers 11a, 11b, and 11c, and registration information regarding each of the host devices 12 sharing the printers 11. As shown in FIG. 1, the registration information storage unit 29 includes a host registration information storage unit 37 and a printer registration information unit 38.

FIG. 3 is a schematic view showing a configuration of the host registration information storage unit 37 of the printing system 10 according to the first embodiment of the present invention. Registration information stored in the host registration information storage unit 37 includes a name of each of the host devices 12, i.e., a host name, and an IP address thereof. As shown in FIG. 3, the host registration information storage unit 37 stores the IP address of each of the host devices 12 according to the host name of each of the host devices 12 as device identification information. More specifically, in the host registration information storage unit 37 shown in FIG. 3, an IP address "192.168.11.x" is stored corresponding to a host name "host a".

FIG. 4 is a schematic view showing a configuration of the printer registration information storage unit 38 of the printing system 10 according to the first embodiment of the present invention. Registration information stored in the printer registration information unit 38 includes a name of each of the printers 11, i.e., a printer name, and an IP address thereof. As shown in FIG. 4, the printer registration information unit 38 stores the IP address of each of the printers 11 according to the printer name of each of the printers 11 as apparatus identification information. More specifically, in the printer registration information unit 38 shown in FIG. 4, an IP address "192.168.11.xxx" is stored corresponding to a printer name "printer a".

In the embodiment, the server communication unit 30 is an interface unit for communication through the network 14 to send and receive data and a signal with respect to the printers 11 or the host devices 12. More specifically, the server communication unit 30 receives the print job from the host devices 12. Further, the server communication unit 30 sends the ping request signal (described later) to each of the host devices 12 along with an IP address of the administrative server 13, and the server communication unit 30 receives the ping response signal from the host devices 12 in an operation state along with the IP address of the host devices 12. Further, the server communication unit 30 sends the print job to the printers 11, and sends a switching instruction signal to the printers 11 for switching the operation mode thereof.

In the embodiment, the host operation information table 31 is a storage unit for storing the host name of each of the host devices 12 in an operation state as an operation host name. FIG. 5 is a schematic view showing a configuration of the host operation information table 31 of the printing system 10 according to the first embodiment of the present invention.

As shown in FIG. 5, the host operation information table 31 stores operation host names "host a" and "host b". At this time, the host device 12a with the host name "host a" and the host device 12b with the host name "host b" are operating or in the operation state. The operation information obtaining unit 32 periodically updates each of the operation host names to be stored in the host operation information table 31.

In the embodiment, the operation information obtaining unit 32 periodically obtains operation information indicating an operation state of each of the host devices 12, and updates the host operation information table 31 according to the operation information. Further, the operation information obtaining unit 32 has a function of counting a number of the host devices 12 in the operation state to obtain an operation host number.

In the embodiment, the operation information obtaining unit 32 controls the server communication unit 30 to send the ping request signal as an obtaining request of the operation state to each of the host devices 12 every specific period of time. Further, the operation information obtaining unit 32 determines as a determining unit whether each of the host devices 12 is in the operation state according to a reception state of the ping response signal from each of the host devices 12. More specifically, when the server communication unit 30 receives the ping response signal and the IP address from the host device 12j, the operation information obtaining unit 32 determines that the host device 12j is in the operation state. Accordingly, the operation information obtaining unit 32 retrieves the host name corresponding to the IP address thus received from the host registration information storage unit 37 (refer to FIG. 3), and stores the host name thus retrieved in the host operation information table 31 as the operation host name.

Further, the operation information obtaining unit 32 counts the operation host names stored in the host operation information table 31 to obtain the operation host number, and notifies the operation host number to the determination control unit 35 through the server control unit 36.

In the embodiment, the operation mode information table 33 stores operation mode information indicating the operation mode of each of the printers 11 as an operation mode information storage unit. FIGS. 6(a) and 6(b) are schematic views showing configurations of the operation mode information table 33 of the printing system 10 according to the first embodiment of the present invention.

As shown in FIGS. 6(a) and 6(b), the operation mode information table 33 stores power source information and operation mode information according to the printer name of each of the printers 11 administered with the administrative server 13. The power source information indicates whether each of the printers 11 administered with the administrative server 13 is turned on or not, and is represented as "ON" and "OFF". The operation mode information indicates the operation mode set in each of the printers 11, and is represented as "printing mode", "power save mode", and "hibernation mode".

More specifically, in the operation mode information table 33 shown in FIG. 6(a), the power source information "ON" and the operation mode information "printing mode" are stored corresponding to the printer names "printer a", "printer b" and "printer c". Accordingly, each of the printer 11a, the printer 11b, and the printer 11c is turned on, and the operation mode of each of the printer 11a, the printer 11b, and the printer 11c is set to the printing mode.

In the operation mode information table 33 shown in FIG. 6(b), the power source information "ON" and the operation mode information "printing mode" are stored corresponding to the printer name "printer a". Further, the power source information "ON" and the operation mode information "power save mode" are stored corresponding to the printer name "printer b". Further, the power source information "ON" and the operation mode information "hibernation mode" are stored corresponding to the printer name "printer c". Accordingly, each of the printer 11a, the printer 11b, and the printer 11c is turned on. The operation mode of the printer 11a is set to the printing mode, that of the printer 11b is set to the power save mode, and that of the printer 11c is set to the hibernation mode.

In the embodiment, the mode setting information storage unit 34 stores mode setting information in advance for setting the operation mode of each of the printers 11. FIG. 7 is a schematic view showing a configuration of the mode setting information storage unit 34 of the printing system 10 according to the first embodiment of the present invention.

As shown in FIG. 7, the mode setting information storage unit 34 stores the printer name and the mode setting information represented as "printing mode", "power save mode", or "hibernation mode" according to the operation host number.

More specifically, in the mode setting information storage unit 34 shown in FIG. 7, no printer name is displayed according to the operation host number "0" and the mode setting information "printing mode". Further, no printer name is displayed according to the operation host number "0" and the mode setting information "power save mode". The printer names "printer a", "printer b", and "printer c" are displayed according to the operation host number "0" and the mode setting information "hibernation mode". In other words, when the operation host number is "0", the mode setting information corresponding to the printer 11a, the printer 11b, and the printer 11c is set to "hibernation mode".

In the mode setting information storage unit 34 shown in FIG. 7, the printer name "printer a" is displayed according to the operation host number "1~3" and the mode setting information "printing mode". Further, no printer name is displayed according to the operation host number "1~3" and the mode setting information "power save mode". The printer names "printer b" and "printer c" are displayed according to the operation host number "1~3" and the mode setting information "hibernation mode". In other words, when the operation host number is 1, 2, or 3, the mode setting information corresponding to the printer 11a is set to "printing mode", and the mode setting information corresponding to the printer 11b and the printer 11c is set to "hibernation mode".

In the mode setting information storage unit 34 shown in FIG. 7, the printer name "printer a" is displayed according to the operation host number "4~5" and the mode setting information "printing mode". Further, the printer name "printer b" is displayed according to the operation host number "4~5" and the mode setting information "power save mode". The printer name "printer c" is displayed according to the operation host number "4~5" and the mode setting information "hibernation mode". In other words, when the operation host number is 4 or 5, the mode setting information corresponding to the printer 11a is set to "printing mode", the mode setting information corresponding to the printer 11b is set to "power save mode", and the mode setting information corresponding to the printer 11c is set to "hibernation mode".

As shown in FIG. 1, the determination control unit 35 includes a comparison determining unit 39 and an instruction updating unit 40. The comparison determining unit 39 retrieves the mode setting information corresponding to each of the printers 11 from the mode setting information storage unit 34 (refer to FIG. 7) according to the operation host number notified from the operation information obtaining unit 32. Further, the comparison determining unit 39 retrieves the operation mode information corresponding to each of the printers 11 from the operation mode information table 33 (refer to FIG. 6). Further, the comparison determining unit 39 compares the mode setting information and the operation mode information per each of the printers 11 to determine whether the mode setting information matches to the operation mode information.

More specifically, when the operation host number is 0, the comparison determining unit 39 retrieves the mode setting information "hibernation mode" from the mode setting information storage unit 34 (refer to FIG. 7) corresponding to the operation host number "0" and the printer name of the printer 11a "printer a". Further, the comparison determining unit 39 retrieves the operation mode information "printing mode" from the operation mode information table 33 (refer to FIG. 6) corresponding to the printer name of the printer 11a "printer a". When the comparison determining unit 39 determines that the mode setting information does not match to the operation mode information, the comparison determining unit 39 notifies the printer name and the mode setting information to the instruction updating unit 40.

In the embodiment, the instruction updating unit 40 sends the switch instruction, the printer name, and the mode setting information to the server control unit 36 according to the printer name and the mode setting information sent from the comparison determining unit 39, so that the switch instruction signal is sent to the corresponding printer 11. Further, the instruction updating unit 40 updates the operation mode information table 33 according to the printer name and the mode setting information.

In the embodiment, the server control unit 36 includes a timer 41 as a date/time obtaining unit having a time measurement function, thereby controlling the registration information storage unit 29, the server communication unit 30, the mode setting information storage unit 34, and the determination control unit 35.

Figure 9:
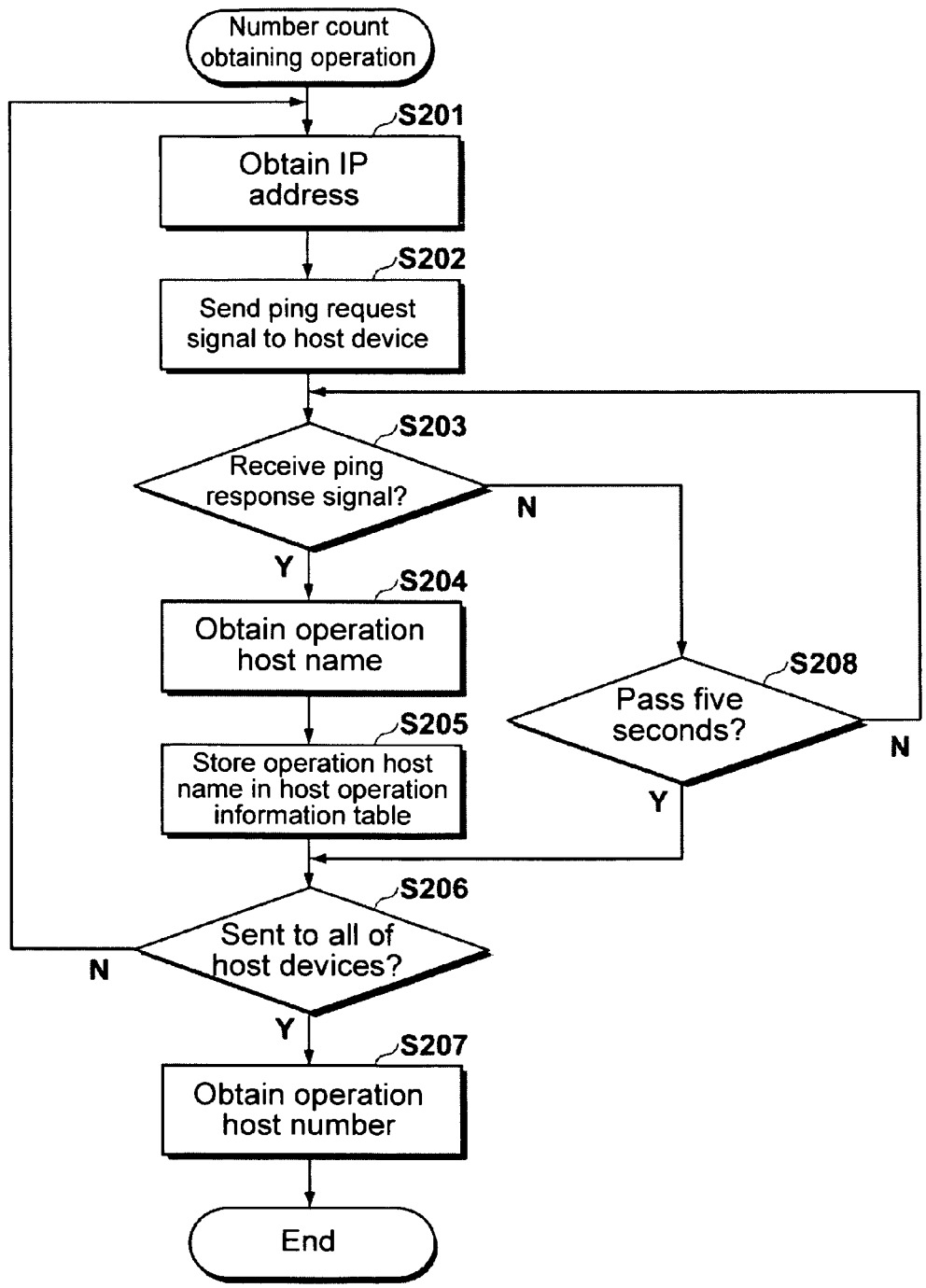
FIG. 9 is a flow chart showing a number count obtaining operation of the printing system according to the first embodiment of the present invention.

An operation of the printing system 10 will be explained next. First, a number count obtaining operation will be explained with reference to a flow chart shown in FIG. 9. In the number count obtaining operation, the administrative server, 13 counts a number of the host devices 12 in the operation state to obtain the operation host number. FIG. 9 is the flow chart showing the number count obtaining operation of the printing system 10 according to the first embodiment of the present invention.

In step S201, in the administrative server 13, the operation information obtaining unit 32 sequentially retrieves and obtains the IP address corresponding to each of the host devices 12 from the host registration information storage unit 37 of the registration information storage unit 29 (refer to FIG. 3). More specifically, the operation information obtaining unit 32 first obtains the IP address "192.168.11.x" corresponding to the host device 12a from the host registration information storage unit 37.

In step S202, the operation information obtaining unit 32 notifies the IP address thus obtained to the server communication unit 30. According to the IP address thus notified, the server communication unit 30 sends the ping request signal along with the IP address of the administrative server 13 to the host device 12a.

When the host device 12a is in the operation state, upon receiving the ping request signal and the IP address, the host communication unit 18 sends the ping response signal corresponding to the ping request signal to the administrative server 13 according to the IP address thus received under the control of the host control unit 19. More specifically, the host communication unit 18 sends the IP address "192.168.11.x" corresponding to the host device 12a along with the ping response signal. When the host device 12a is not in the operation state, the host communication unit 18 does not receive the ping request signal from the administrative server 13, and there is no response from the host device 12a to the administrative server 13.

In step S203, in the administrative server 13, when the server communication unit 30 receives the IP address "192.168.11.x" and the ping response signal, the server communication unit 30 notifies the IP address thus received to the operation information obtaining unit 32.

In step S204, according to the IP address "192.168.11.x", the operation information obtaining unit 32 searches the host registration information storage unit 37 to obtain the corresponding host name "host a" as the operation host name.

In step S205, the operation information obtaining unit 32 determines that the host device 21a is in the operation state, and stores the operation host name "host a" in the host operation information table 31 (refer to FIG. 3).

In step S206, the operation information obtaining unit 32 determines whether the ping request signal is sent to all of the host devices 12. When the operation information obtaining unit 32 determines that the ping request signal is not sent to all of the host devices 12 (step S206), the operation information obtaining unit 32 retrieves and obtains the IP address of the next one of the host devices 12 from the host registration information storage unit 37 (step S201). Then, similar to the case of the host device 12a, the process is repeated from step S202 to step S206.

In step S208, when five seconds passes without receiving the ping response signal in step S203, the operation information obtaining unit 32 determines that the corresponding host device 12 is not in the operation state, and the process from step S204 to step S205 is skipped.

When the operation information obtaining unit 32 determines that the ping request signal is sent to all of the host devices 12 (step S206), the operation information obtaining unit 32 counts the operation host name stored in the host operation information table 31, thereby obtaining the operation host number (step S207). Afterward, the operation information obtaining unit 32 notifies the operation host number thus obtained to the server control unit 36, thereby completing the number count obtaining operation of the printing system 10.

As described above, the operation information is obtained according to the response from the host devices 12, and the operation host number is counted and obtained.

Figure 8:
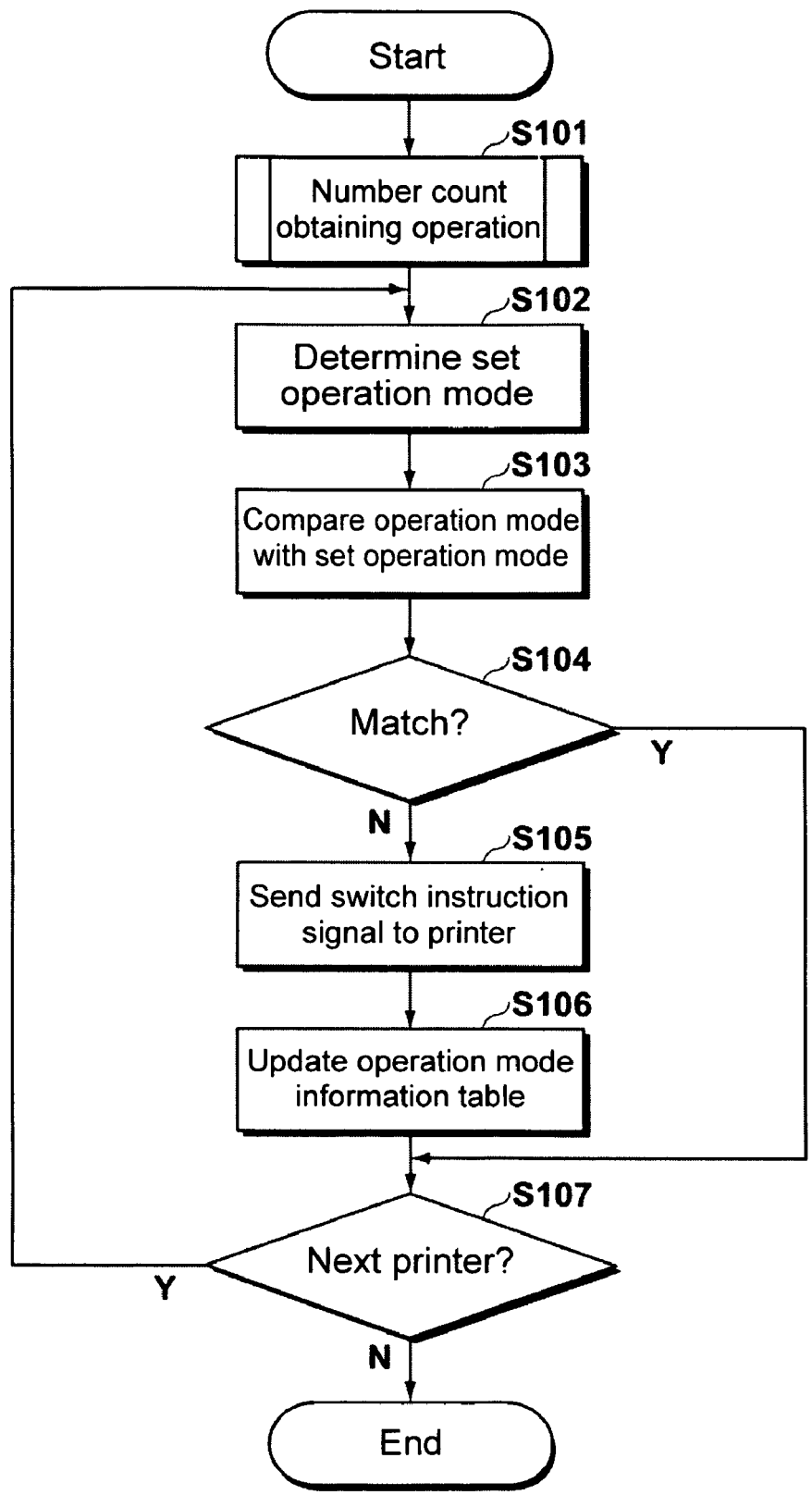
FIG. 8 is a flow chart showing a mode administration operation of the printing system according to the first embodiment of the present invention.

Another operation of the printing system 10, i.e., a mode administration operation, will be explained next with reference to a flow chart shown in FIG. 8. In the mode administration operation, the administrative server 13 administers the operation mode of each of the printers 11. FIG. 8 is the flow chart showing the mode administration operation of the printing system 10 according to the first embodiment of the present invention.

It is assumed that each of the printers 11 is operating in the printing mode as shown in FIG. 6(*a*), and the operation host number "4" is obtained in the number count obtaining operation shown in FIG. 9.

In step S101, in the administrative server 13, the operation information obtaining unit 32 periodically obtains the operation state from each of the host devices 12 under the control of the server control unit 36. Accordingly, the operation information obtaining unit 32 counts the number of the host devices 12 in the operation state, thereby performing the number count obtaining operation shown in FIG. 9. As a result, the operation information obtaining unit 32 obtains the operation host number "4", and notifies the operation host number to the server control unit 36.

In step S102, the comparison determining unit 39 of the determination control unit 35 determines the set operation mode with respect to each of the printers 11 according to the operation host number "4". More specifically, in order to determine the set operation mode with respect to the printer 11*a*, the comparison determining unit 39 retrieves the mode setting information "printing mode" from the mode setting information storage unit 34 (refer to FIG. 7) according to the operation host number "4" and the printer name "printer a". Accordingly, the comparison determining unit 39 determines the set operation mode with respect to the printer 11*a* as "printing mode".

In step S103, the comparison determining unit 39 retrieves the operation mode information from the operation mode information table 33, and compares the operation mode with the set operation mode with respect to each of the printers 11. More specifically, the comparison determining unit 39 retrieves the operation mode information "printing mode" corresponding to the printer 11*a* from the operation mode information table 33 (refer to FIG. 6(*a*)). Then, the comparison determining unit 39 compares the operation mode "printing mode" of the printer 11*a* with the set operation mode "printing mode" determined in step S102.

In step S104, it is determined whether the operation mode matches to the set operation mode. In step S107, when it is determined that the operation mode matches to the set operation mode, the comparison determining unit 39 determines whether there is the next printer 11.

When the comparison determining unit 39 determines that there is the next printer 11, the comparison determining unit 39 determines the set operation mode with respect to the printer 11*b* in step S102. More specifically, the comparison determining unit 39 retrieves the mode setting information "power save mode" from the mode setting information storage unit 34 (refer to FIG. 7) according to the operation host number "4" and the printer name "printer b". Accordingly, the comparison determining unit 39 determines the set operation mode with respect to the printer 11*b* as "power save mode".

Further, the comparison determining unit 39 retrieves the operation mode information "printing mode" corresponding to the printer 11*b* from the operation mode information table 33 (refer to FIG. 6(*a*)). Then, the comparison determining unit 39 compares the operation mode "printing mode" of the printer 11*b* with the set operation mode "power save mode".

When it is determined that the operation mode does not match to the set operation mode in step S104, the comparison determining unit 39 notifies the printer name "printer b" and the set operation mode "power save mode" to the instruction updating unit 40. In order to instruct switching of the operation mode, the instruction updating unit 40 sends the printer name "printer b" and the set operation mode "power save mode" to the server control unit 36.

In step S105, the server control unit 36 retrieves the IP address "192.168.11.yyy" corresponding to the printer name "printer b" thus received from the printer registration information unit 38 (refer to FIG. 4). Then, the server control unit 36 sends the switch instruction signal to the printer 11*b* for switching the operation mode of the printer 11*b* to the power save mode according to the IP address thus retrieved.

When the printer communication unit 20 receives the switch instruction signal from the administrative server 13, in the printer 11*b*, the printer control unit 24 notifies the reception of the switch instruction signal to the switching unit 28 of the supply control unit 23. Then, the switching unit 28 sends an instruction to the power supply unit 22 to switch the operation mode of the printer 11*b* from the printing mode to the power save mode. According to the instruction, the power supply unit 22 stops supplying power to the heater 27 of the fixing unit 26. Accordingly, the operation mode of the printer 11*b* is switched from the printing mode to the power save mode.

In step S106, in the administrative server 13, the instruction updating unit 40 updates the operation mode information table 33 according to the printer name "printer b" and the set operation mode "power save mode". More specifically, the instruction updating unit 40 rewrites the operation mode information corresponding to the printer name "printer b" from "printing mode" to "power save mode" in the operation mode information table 33 (refer to FIG. 6(*a*)), thereby updating the operation mode information table 33. When the update is completed, the instruction updating unit 40 notifies the update completion to the comparison determining unit 39.

Afterward, the comparison determining unit 39 determines whether there is the next printer 11 in step S107. When the comparison determining unit 39 determines that there is the next printer 11, the comparison determining unit 39 determines the set operation mode with respect to the printer 11*c* in step S102. More specifically, the comparison determining unit 39 retrieves the mode setting information "hibernation mode" from the mode setting information storage unit 34 (refer to FIG. 7) according to the operation host number "4" and the printer name "printer c". Accordingly, the comparison determining unit 39 determines the set operation mode with respect to the printer 11*c* as "hibernation mode".

Further, the comparison determining unit 39 retrieves the operation mode information "printing mode" corresponding to the printer 11*c* from the operation mode information table 33 (refer to FIG. 6(*a*)). Then, the comparison determining unit 39 compares the operation mode "printing mode" of the printer 11*c* with the set operation mode "hibernation mode".

When it is determined that the operation mode does not match to the set operation mode in step S104, the comparison determining unit 39 notifies the printer name "printer c" and the set operation mode "hibernation mode" to the instruction updating unit 40. In order to instruct switching of the operation mode, the instruction updating unit 40 sends the printer name "printer c" and the set operation mode "hibernation mode" to the server control unit 36.

In step S105, the server control unit 36 retrieves the IP address "192.168.11.zzz" corresponding to the printer name "printer c" thus received from the printer registration information unit 38 (refer to FIG. 4). Then, the server control unit 36 sends the switch instruction signal to the printer 11c for switching to the hibernation mode according to the IP address thus retrieved.

When the printer communication unit 20 receives the switch instruction signal from the administrative server 13, in the printer 11c, the printer control unit 24 notifies the reception of the switch instruction signal to the switching unit 28 of the supply control unit 23. Then, the switching unit 28 sends an instruction to the power supply unit 22 to switch the operation mode of the printer 11c from the printing mode to the hibernation mode. According to the instruction, the power supply unit 22 stops supplying power to the printing unit 21, i.e., the developing unit 25 and the fixing unit 26. Accordingly, the operation mode of the printer 11c is switched from the printing mode to the hibernation mode.

In step S106, in the administrative server 13, the instruction updating unit 40 updates the operation mode information table 33 according to the printer name "printer c" and the set operation mode "hibernation mode". More specifically, the instruction updating unit 40 rewrites the operation mode information corresponding to the printer name "printer c" from "printing mode" to "hibernation mode" in the operation mode information table 33 (refer to FIG. 6(a)), thereby updating the operation mode information table 33. When the update is completed, the instruction updating unit 40 notifies the update completion to the comparison determining unit 39.

Afterward, the comparison determining unit 39 determines whether there is the next printer 11 in step S107. When the comparison determining unit 39 determines that there is no next printer 11, the mode administration operation of the printing system 10 is completed.

As described above, the set operation mode is determined according to the operation host number. When the operation mode does not match to the set operation mode, the operation mode of the printer 11 is switched to the set operation mode. After the operation mode is switched, the operation mode information of the printer 11 is stored in the operation mode information table 33 (refer to FIG. 6(b)).

A printing operation of the printing system 10 will be explained next. In the printing system 10, when a user of one of the host devices 12 operates the input unit 16 for requesting the printing operation, the input unit 16 inputs a printing request to the host control unit 19. Then, the job creation unit 17 generates the print job under the control of the host control unit 19, and the host communication unit 18 sends the print job to the administrative server 13.

In the administrative server 13, when the server communication unit 30 receives the print job from the one of the host devices 12, the server control unit 36 retrieves the operation mode information of each of the printers 11 from the operation mode information table 33, thereby determining the printers 11 having the printing mode as the operation mode thereof. In the operation mode information table 33 shown in FIG. 6(b), the operation mode information "printing mode" is stored corresponding to the printer name "printer a". Accordingly, the server control unit 36 identifies the printer 11a. Then, the server control unit 36 retrieves the IP address "192.168.11.xxx" corresponding to the printer name "printer a", and the server communication unit 30 sends the print job to the printer 11a according to the IP address.

In the next step, in the printer 11a, when the printer communication unit 20 receives the print job from the administrative server 13, the printing unit 21 performs the printing operation under the control of the printer control unit 24. As described above, the print job is sent to the printer 11 with the printing mode through the administrative server 13, thereby performing the printing operation.

As described above, in the printing system 10 in the embodiment, the operation state of the host devices 12 is periodically monitored, and the operation mode of each of the printers 11 with power on is administered according to the operation host number. Accordingly, it is possible to reduce wasteful energy consumption. Further, each of the printers 11 has the three operation mode, i.e., the printing mode, the power save mode, and the hibernation mode. Accordingly, it is possible to further conserve energy and improve operability.

In the embodiment, after the server communication unit 30 sends the switch instruction signal, the operation mode information table 33 of the administrative server 13 is updated. Alternatively, it may be arranged such that, for example, after the count number obtaining operation of the operation host number, the ping request signal is sent to each of the printers 11, thereby obtaining the operation mode information. In this case, after the operation mode information table 33 is updated, when the operation mode of one of the printers 11 is changed, or the power is turned off, it is still possible to properly administer the operation mode.

The first embodiment may be modified as follows. In the modified example, the administrative server 13 stores print histories of the printers 11 as shown in Table below.

| Host device | Printer | Time | Host device | Printer | Time |
| --- | --- | --- | --- | --- | --- |
| Host a | Printer a | 08:10 | Host b | Printer c | — |
| Host a | Printer a | 08:23 | Host b | Printer c | — |
| Host a | Printer b | 09:05 | Host b | Printer c | — |
| Host a | Printer b | 10:00 | Host b | | |

When the operation mode of one of the printers 11 is switched according to the operation host number, and when only, for example, the host device 12b is in the operation state, the operation mode of the printer 11c, not the printer 11a, is maintained to the printing mode, and the operation modes of the printer 11a and the printer 11b are switched to the hibernation mode. In other word, not limited to the mode setting information storage unit 34 shown in FIG. 7, the host device 12 selects the printer with the highest usage or used most recently.

Alternatively, the host device 12 may add default printer information set on the host device 12 to the ping response signal. Then, the printer name information in the default printer information is retrieved from the host device 12, so that the mode setting information storage unit 34 shown in FIG. 7 is updated.

Second Embodiment

Figure 10:
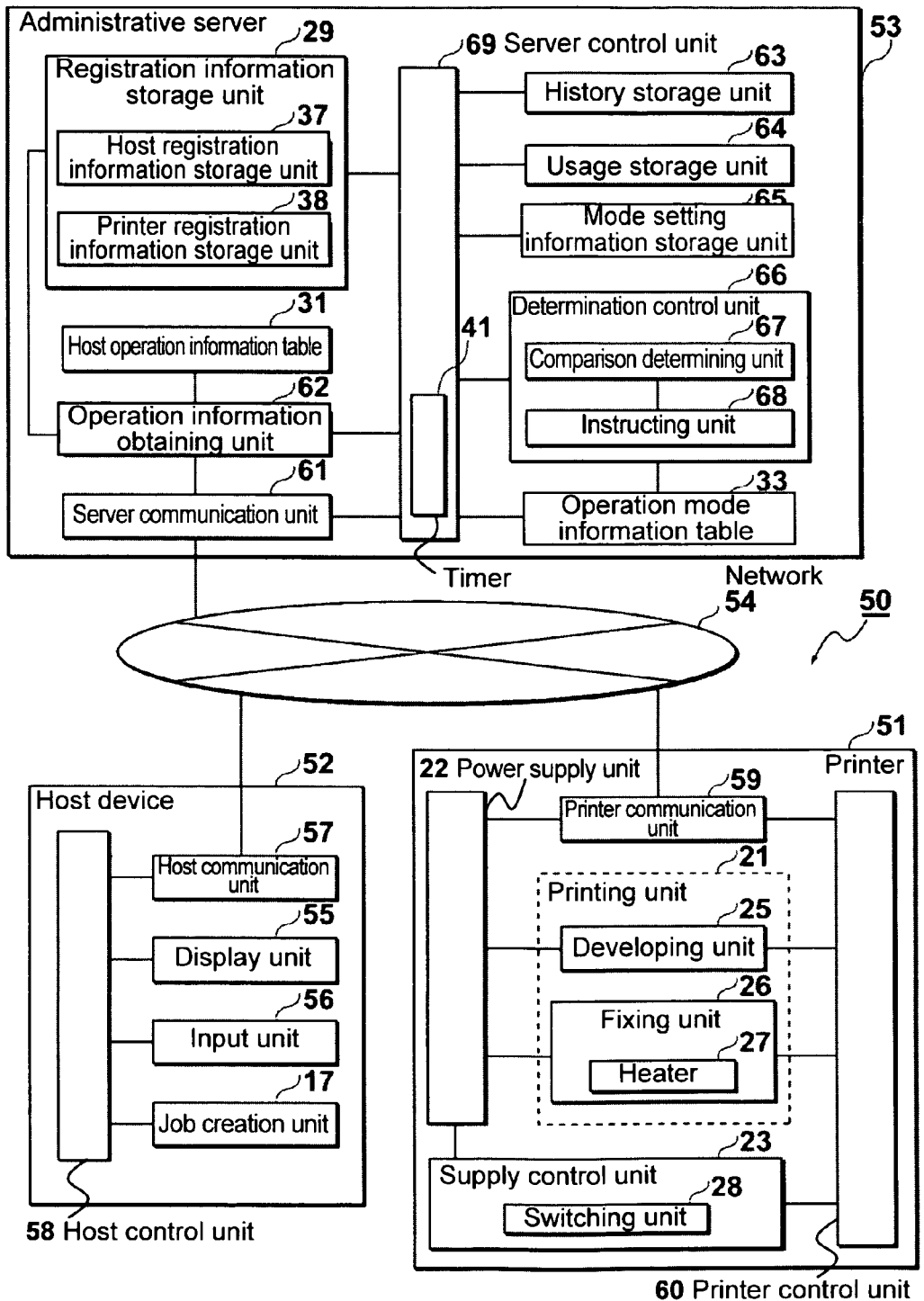
FIG. 10 is a block diagram showing a configuration of a printing system according to a second embodiment of the present invention.

A second embodiment of the present invention will be described next. FIG. 10 is a block diagram showing a configuration of a printing system 50 according to the second embodiment of the present invention.

As shown in FIG. 10, the printing system 50 includes three printers 51; an n number of host devices 52; and an administrative server 53. The printers 51, the host devices 52, and the administrative server 53 are connected to with each other through a network 54. In the second embodiment, components similar to those in the first embodiment are designated with the same reference numerals, and explanations thereof are omitted.

As shown in FIG. 10, each of the host devices 52 is, formed of, for example, a personal computer. Each of the host devices 52 includes a display unit 55; an input unit 56; the job creation unit 17; a host communication unit 57;

and a host control unit 58.

In the embodiment, the display unit 55 is formed of, for example, a display for displaying a screen to select one of the printers 51 for the printing operation. The input unit 56 is formed of, for example, a mouse and a keyboard for inputting the print request and the printer name as apparatus identification information for specifying one of the printers 51.

In the embodiment, the host communication unit 57 is an interface unit for communication through the network 54 to send and receive data and a signal with the administrative server 53. More specifically, the host communication unit 57 sends the print job along with the IP addresses of the host devices 52 to the administrative server 53. When the host communication unit 57 receives the ping request signal from the administrative server 53, the host communication unit 57 sends the ping response signal and the IP addresses to the administrative server 53. The host control unit 58 has a function of controlling the display unit 55, the input unit 56, and the host communication unit 57.

In the embodiment, the host devices 52 share the printers 51, and the printers 51 operate one of three operation modes, i.e., the printing mode, the power save mode, and the hibernation mode.

As shown in FIG. 10, each of the printers 51 includes a printer communication unit 59; the printing unit 21; the power supply unit 22; the supply control unit 23; and a printer control unit 60.

In the embodiment, the printer communication unit 59 is an interface unit for communication through the network 54 to send and receive data and a signal with respect to the administrative server 53. More specifically, the printer communication unit 59 receives the print job from the administrative server 53. Further, the printing system 50 receives the switching instruction from the administrative server 53 for switching the operation mode. Still further, the administrative server 53 receives the ping request signal from the administrative server 53, and sends the ping response signal and the IP address along with the operation mode information indicating the operation modes of the printers 51 to the administrative server 53. The printer control unit 60 controls the printer communication unit 59, the printing unit 21, the power supply unit 22, and the supply control unit 23.

As shown in FIG. 10, the administrative server 53 includes the registration information storage unit 29; a server communication unit 61; the host operation information table 31; an operation information obtaining unit 62; the operation mode information table 33; a history storage unit 63; a usage storage unit 64; a mode setting information storage unit 65; a determination control unit 66; and a server control unit 69.

In the embodiment, the server communication unit 61 is an interface unit for communication through the network 54 to send and receive data and a signal with the printers 51 or the host devices 52. More specifically, the server communication unit 61 receives the print job and the IP addresses from the host devices 52. Further, the server communication unit 61 sends the ping request signal to each of the host devices 52 along with the IP address of the administrative server 53, and the server communication unit 61 receives the ping response signal from the host devices 52 in an operation state along with the IP addresses of the host devices 52. Further, the server communication unit 61 sends the print job to the printers 51, and sends the ping request signal of each of the printers 51 along with the IP addresses of the host devices 52. Still further, the server communication unit 61 receives the ping response signal and the operation mode information from the printers 51 with power turned on, and sends the switching instruction signal to the printers 51 for switching the operation mode.

In the embodiment, the operation information obtaining unit 62 periodically obtains the operation information indicating the operation state of each of the host devices 52, and updates the host operation information table 31 according to the operation information. Further, the operation information obtaining unit 62 has a function of counting a number of the host devices 52 in the operation state to obtain the operation host number. Still further, the operation information obtaining unit 62 periodically obtains the operation mode information of the printers 51, and updates the operation mode information table 33 according to the operation mode information.

In the embodiment, the operation information obtaining unit 62 controls the server communication unit 61 to send the ping request signal as an obtaining request of the operation mode information to each of the printers 51 every specific period of time. Further, the operation information obtaining unit 62 determines whether power source information of each of the printers 51 is in an on state according to a reception state of the ping response signal from each of the printers 51. More specifically, when the server communication unit 61 receives the ping response signal, the operation mode information, and the IP address from the printers 51$i$ ($i$=a, b, c), the operation information obtaining unit 62 determines that the power source information of the printers 51$i$ is in the on state. Accordingly, the operation information obtaining unit 62 retrieves the printer name corresponding to the IP address thus received from the printer registration information unit 38 (refer to FIG. 3), and stores the power source information "ON" and the operation mode information thus received in the operation mode information table 33 (refer to FIGS. 6(a) and 6(b)) according to the printer name.

In the embodiment, the history storage unit 63 is a storage unit for storing history information indicating a history of the print job performed with the server communication unit 61. FIG. 11 is a schematic view showing a configuration of the history storage unit 63 of the printing system 50 according to the second embodiment of the present invention.

As shown in FIG. 11, the history information is stored in the history storage unit 63 according to date/time information indicating a date and a time when the print job is received. The history information includes the host names of the host devices 52 as the origination of the print job, and the printer names of the printers 51 as the destination of the print job.

More specifically, in the history storage unit 63 shown in FIG. 11, the host name "host a" and the printer name "printer a" are stored corresponding to the date/time information "03/04 Tue 13:11". The history information indicates that the host device 52$a$ sent the print job received on 03/04, Tuesday at 13:11 to the printer 51$a$.

In the embodiment, the usage storage unit 64 is a storage unit for storing usage of the printers 51 according to date and time. FIG. 12 is a schematic view showing a configuration of the usage storage unit 64 of the printing system 50 according to the second embodiment of the present invention.

As shown in FIG. 12, the usage storage unit 64 stores the usage of the printers 51 according to date and time for one week. More specifically, in the usage storage unit 64 shown in FIG. 12, the usage "0" is stored according to the date "Mon" and the time "0:00~4:00". This means that the number of the print jobs sent from the administrative server 53 to the printers 51 is zero during the time 0:00~4:00 on Monday of the week. Further, in the usage storage unit 64, the usage "12" is stored according to the date "Wed" and the time "8:00~12:00". This means that the number of the print jobs sent from the administrative server 53 to the printers 51 is 12 during the time 8:00~12:00 on Wednesday of the week.

In the embodiment, the mode setting information storage unit 65 is a storage unit for storing the mode setting information in advance. FIG. 13 is a schematic view showing a configuration of the mode setting information storage unit 65 of the printing system 50 according to the second embodiment of the present invention.

As shown in FIG. 13, the mode setting information storage unit 65 stores in advance a printer number indicating the number of the printers 51 according to the usage and the operation mode information.

More specifically, in the mode setting information storage unit 65 shown in FIG. 13, the printer number "0" is displayed according to the usage "0~5" and the mode setting information "printing mode". Further, the printer number "1" is displayed according to the usage "0~5" and the mode setting information "power save mode". The printer number "2" is displayed according to the usage "0~5" and the mode setting information "hibernation mode". In other words, when the usage is "0~5", the number of the printers 11 set in the printing mode is zero; the number of the printers 11 set in the power save mode is one; and the number of the printers 11 set in the hibernation mode is two.

As shown in FIG. 10, the determination control unit 66 includes a comparison determining unit 67 and an instructing unit 68. The comparison determining unit 67 retrieves the mode setting information corresponding to each of the printers 51 from the operation mode information table 33 (refer to FIGS. 6(a) and 6(b)). Further, the comparison determining unit 67 compares the operation mode information with the mode setting information notified from the server control unit 69 to determine whether the operation mode information matches to the mode setting information.

In the embodiment, the instructing unit 68 sends the switching instruction, the printer name, and the mode setting information to the server control unit 69, thereby sending the switching instruction signal to a corresponding one of the printers 51 according to the printer name and the mode setting information notified from the server control unit 69.

In the embodiment, the server control unit 69 includes a timer 41 as a date/time obtaining unit, and controls the registration information storage unit 29, the server communication unit 61, the operation information obtaining unit 62, the history storage unit 63, the usage storage unit 64, the mode setting information storage unit 65, and the determination control unit 66. Further, the server control unit 69 as a reading unit retrieves the usage from the usage storage unit 64 according to date/time information obtained with the timer 41.

Further, the server control unit 69 as a usage obtaining unit searches the history storage unit 63 according to the host name to obtain the history, i.e., the number of the print jobs, as the usage, thereby updating the usage storage unit 64. Further, the server control unit 69 searches the history storage unit 63 according to the host name and the printer name to obtain the history, i.e., the total number of the print jobs, as priority of each of the printers 51.

Figure 14:
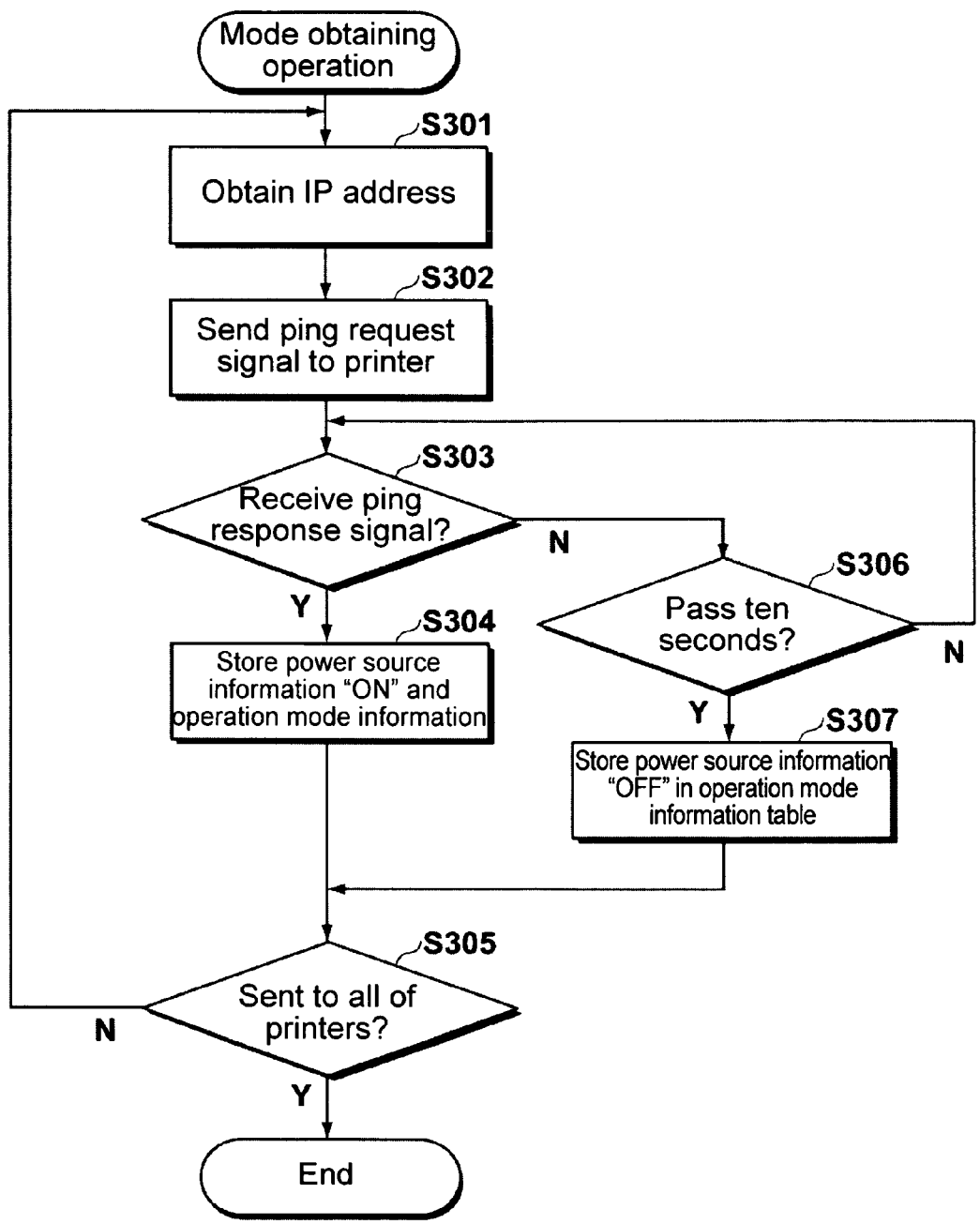
FIG. 14 is a flow chart showing a mode obtaining operation of the printing system according to the second embodiment of the present invention.

An operation of the printing system 50 will be explained next. First, a mode obtaining operation will be explained with reference to a flow chart shown in FIG. 14. In the mode obtaining operation, the administrative server 53 obtains the operation mode information of the printers 51 with the power source information "ON". FIG. 14 is the flow chart showing the mode obtaining operation of the printing system 50 according to the second embodiment of the present invention.

In step S301, in the administrative server 53, the operation information obtaining unit 62 sequentially retrieves and obtains the IP address corresponding to each of the printers 51 from the printer registration information unit 38 of the registration information storage unit 29 (refer to FIG. 4). More specifically, the operation information obtaining unit 62 first obtains the IP address "192.168.11.xxx" corresponding to the printer name "printer a" of the printer 52a from the printer registration information unit 38.

In step S302, the operation information obtaining unit 62 notifies the IP address thus obtained to the server communication unit 61. According to the IP address "192.168.11.xxx" thus notified, the server communication unit 61 sends the ping request signal along with the IP address of the administrative server 53 to the printer 51a.

When the printer 51a is turned on, upon receiving the ping request signal and the IP address from the administrative server 53, the printer communication unit 59 sends the ping response signal corresponding to the ping request signal to the administrative server 53 according to the IP address thus received under the control of the printer control unit 60. More specifically, the printer communication unit 59 sends the operation mode information and the IP address "192.168.11.xxx" corresponding to the printer 51a along with the ping response signal. When the printer 51a is not turned on, the printer communication unit 59 does not receive the ping request signal from the administrative server 53, and there is no response from the printer 51a to the administrative server 53.

In step S303, in the administrative server 53, when the server communication unit 61 receives the operation mode information, the IP address "192.168.11.xxx" and the ping response signal, the server communication unit 61 notifies the operation mode information and the IP address thus received to the operation information obtaining unit 62.

In step S304, according to the IP address "192.168.11.xxx" thus notified, the operation information obtaining unit 62 searches the printer registration information unit 38 to obtain the corresponding printer name "printer a". Then, the operation information obtaining unit 62 determines that the printer 51a is turned on, and stores the power source information "ON" and the operation mode information thus received in the operation mode information table 33 (refer to FIGS. 6(a) and 6(b)) corresponding to the printer name "printer a".

In step S305, the operation information obtaining unit 62 determines whether the ping request signal is sent to all of the printers 51. When the operation information obtaining unit 32 determines that the ping request signal is not sent to all of the printers 51 (step S305), the operation information obtaining unit 62 retrieves and obtains the IP address of the next one of the printers 51 from the printer registration information unit 38 (step S301). Then, the process is repeated from step S302 to step S305.

In step S306, when ten seconds passes without receiving the ping response signal, the operation information obtaining unit 62 determines that printer 51 is turned off. In step S307, the operation information obtaining unit 62 obtains the printer name of the corresponding printer 51, and stores the power source information "OFF", the operation mode information "−" in the operation mode information table 33 (refer to FIGS. 6(a) and 6(b)) according to the printer name thus obtained.

Afterward, when the operation information obtaining unit 62 determines that the ping request signal is sent to all of the printers 51 (step S305), the mode obtaining operation of the printing system 50 is completed. As described above, the operation mode information is obtained from each of the printers 51, and the operation mode information table 33 is updated.

Figure 15:
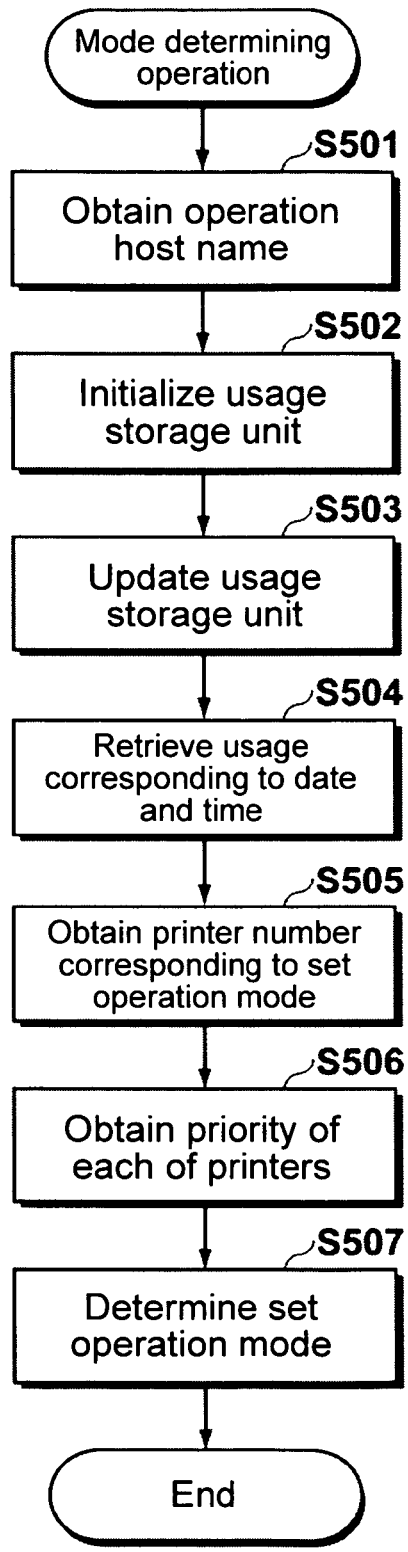
FIG. 15 is a flow chart showing a mode determining operation of the printing system according to the second embodiment of the present invention.

Another operation of the printing system 50, i.e., a mode determining operation, will be explained next with reference to a flow chart shown in FIG. 15. In the mode determining operation, the administrative server 53 determines the operation mode of each of the printers 51. FIG. 15 is the flow chart showing the mode determining operation of the printing system 50 according to the second embodiment of the present invention.

It is assumed that the current date and time is "03/12 Wed 8:00", and the operation host name "host a" is stored in the host operation information table 31.

In step S501, in the administrative server 53, the operation information obtaining unit 62 obtains the operation host name "host a" from the host operation information table 31. In step S502, the operation information obtaining unit 62 initializes the usage storage unit 64. Accordingly, the history storage unit 63 stores the usage "0" according to each date and time range.

In step S503, according to the operation host name "host a", the server control unit 69 searches the history storage unit 63 to retrieve the history information corresponding to the host device 52a, thereby updating the usage storage unit 64. More specifically, according to the operation host name "host a", the server control unit 69 retrieves the history information including the date/time information "03/04 Tue 13:11" from the history storage unit 63 (refer to FIG. 11). Then, according to the date/time information, the server control unit 69 adds one to the usage corresponding to the date "Tue" and the time "12:00~16:00", thereby updating the usage storage unit 64. At the same time, the server control unit 69 retrieves all of the history information corresponding to the operation host name "host a", thereby updating the usage storage unit 64.

In step S504, according to the date/time information "03/12 Wed 8:00" obtained with the timer 41, the server control unit 69 specifies the date "Wed" and the time "8:00~12:00", and retrieves the usage corresponding to the date and the time from the usage storage unit 64. More specifically, the server control unit 69 retrieves the usage "12" corresponding to the date "Wed" and the time "8:00~12:00" from the usage storage unit 64 (refer to FIG. 12).

In step S505, according to the usage "12" thus retrieved, the server control unit 69 obtains the printer number corresponding to the set operation mode from the mode setting information storage unit 65. More specifically, the server control unit 69 obtains the printer number "1" corresponding to the set operation mode "printing mode"; the printer number "1" corresponding to the set operation mode "power save mode"; and the printer number "1" corresponding to the set operation mode "hibernation mode", respectively.

In step S506, the server control unit 69 obtains the priority of each of the printers 51. More specifically, first, according to the operation host name "host a" and the printer name "printer a", the server control unit 69 searches the history storage unit 63 and obtains a total sum of the corresponding history information, so that the usage of the printer 51a is obtained as the priority. Similarly, the server control unit 69 obtains the priorities of the printer 51b and the printer 51c, respectively (step S506). More specifically, the server control unit 69 obtains the priority "2" corresponding to the printer 51; the priority "1" corresponding to the printer 51b; and the priority "0" corresponding to the printer 51c, respectively, from the history storage unit 63 shown in FIG. 11.

In step S507, according to the printer numbers obtained in step S505 and the priorities obtained in step S506, the server control unit 69 determines the set operation mode corresponding to each of the printers 51. More specifically, in the order of the printers 51 having a higher priority, the server control unit 69 determines that the set operation mode of the printer 51a is the printing mode; the set operation mode of the printer 51b is the power save mode; and the set operation mode of the printer 51c is the hibernation mode. Accordingly, the mode determining operation of the printing system 50 is completed.

As described above, according to the history information corresponding to each of the host devices 52 in the operation state, the set operation mode of each of the printers 51 is determined.

Figure 16:
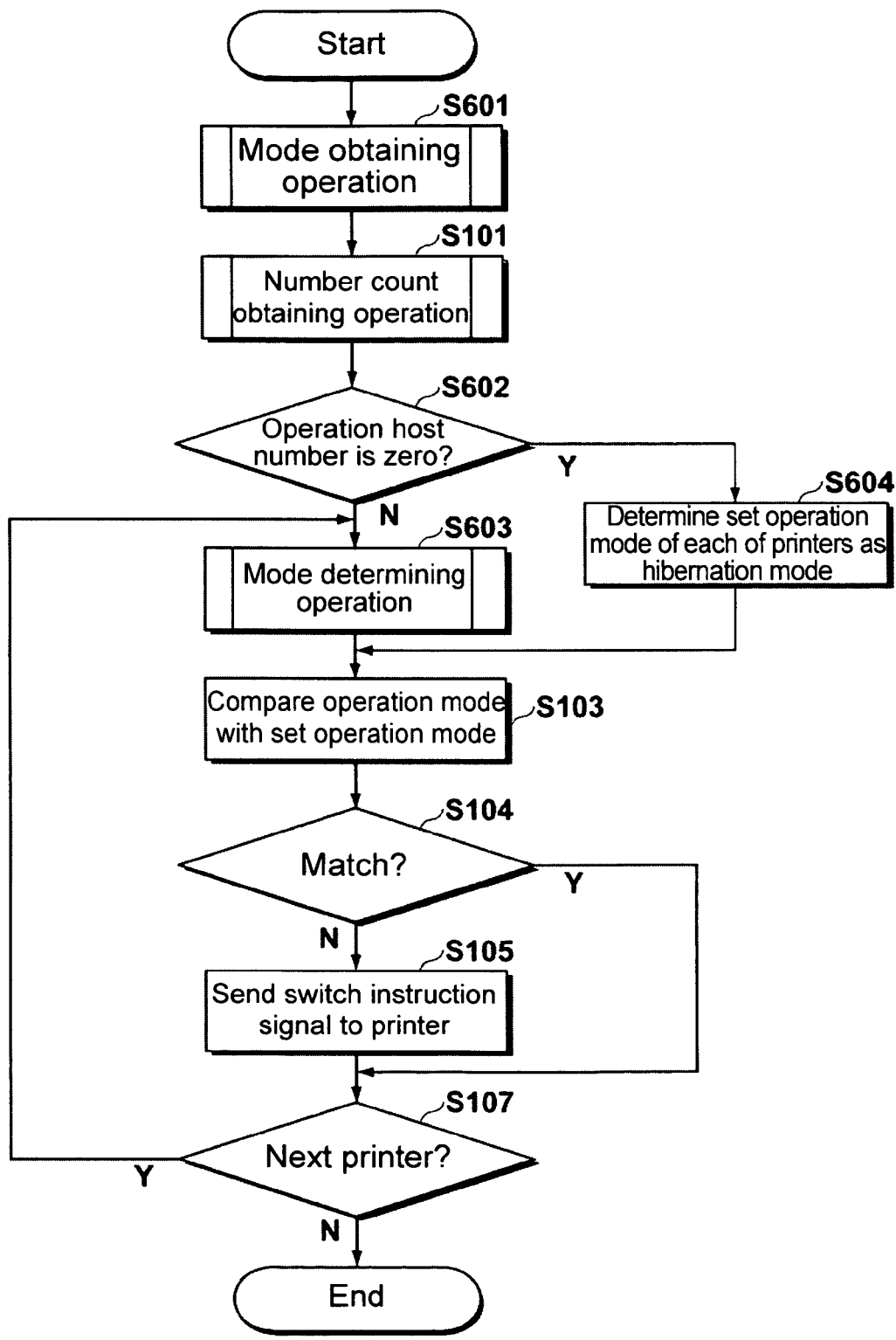
FIG. 16 is a flow chart showing a mode administration operation of the printing system according to the second embodiment of the present invention.

A further operation of the printing system 50, i.e., a mode administration operation, will be explained next with reference to a flow chart shown in FIG. 16. In the mode administration operation, the administrative server 53 administers the operation mode of each of the printers 51. FIG. 16 is the flow chart showing the mode administration operation of the printing system 50 according to the second embodiment of the present invention.

It is assumed that each of the printers 51 is operating in the printing mode as shown in FIG. 6(a). Further, the set operation modes corresponding to the printers 51a, 51b, and 51c are determined to be the printing mode, the power save mode, and the hibernation mode, respectively, in the mode determining operation shown in FIG. 15.

In step S601, in the administrative server 53, the operation information obtaining unit 62 periodically performs the mode obtaining operation (refer to FIG. 14) to obtain the operation mode information corresponding to each of the printers 51 under the control of the server control unit 69, thereby updating the operation mode information table 33.

In step S101, the operation information obtaining unit 62 obtains the operation state of each of the host devices 52. Accordingly, the operation information obtaining unit 62 counts the number of the host devices 52 in the operation state, thereby performing the number count obtaining operation shown in FIG. 9. Then, the operation information obtaining unit 62 obtains the operation host number, and notifies the operation host number to the server control unit 69.

In step S602, the server control unit 69 determines whether the operation host number is zero. In step S603, when it is determined that the operation host number is not zero, the server control unit 69 performs the mode determining operation (refer to FIG. 15), thereby determining the set operation mode with respect to each of the printers 51. More specifically, the server control unit 69 determines the set operation mode of each of the printer 51a, 51b, and 51c as the printing mode, the power save mode, or the hibernation mode, respectively. Then, the server control unit 69 notifies the set operation mode to the determination control unit 66.

In step S103, the comparison determining unit 67 of the determination control unit 66 retrieves the operation mode information from the operation mode information table 33, and compares the operation mode with the set operation mode with respect to each of the printers 51. More specifically, the comparison determining unit 67 retrieves the operation mode information "printing mode" corresponding to the printer 51a from the operation mode information table 33 (refer to FIG. 6(a)). Then, the comparison determining unit 67 compares the operation mode "printing mode" of the printer 51a with the set operation mode "printing mode" determined in step S603.

In step S104, it is determined whether the operation mode matches to the set operation mode. In step S107, when it is determined that the operation mode matches to the set operation mode, the comparison determining unit 67 determines whether there is the next printer 51.

In step S103, when the comparison determining unit 67 determines that there is the next printer 51, the comparison determining unit 67 retrieves the operation mode information "printing mode" with respect to the printer 51b from the operation mode information table 33 (refer to FIG. 6(a)). Accordingly, the comparison determining unit 67 compares the operation mode information "printing mode" with respect to the printer 51b with the set operation mode "power save mode".

When it is determined that the operation mode does not match to the set operation mode in step S104, the comparison determining unit 67 notifies the printer name "printer b" and the set operation mode "power save mode" to the instructing unit 68. In order to instruct switching of the operation mode, the instructing unit 68 sends the printer name "printer b" and the set operation mode "power save mode" to the server control unit 69.

In step S105, the server control unit 69 retrieves the IP address "192.168.11.yyy" corresponding to the printer name "printer b" thus received from the printer registration information unit 38 (refer to FIG. 4). Then, the server communication unit 61 sends the switch instruction signal to the printer 51b for switching to the power save mode according to the IP address thus retrieved. Afterward, the instructing unit 68 notifies the instruction completion to the comparison determining unit 67.

When the printer communication unit 59 receives the switch instruction signal from the administrative server 53, in the printer 51b, the switching unit 28 sends the instruction to the power supply unit 22 to switch the operation mode of the printer 51b from the printing mode to the power save mode. According to the instruction, the power supply unit 22 stops supplying power to the heater 27 of the fixing unit 26. Accordingly, the operation mode of the printer 51b is switched from the printing mode to the power save mode.

In the administrative server 53, when the comparison determining unit 67 receives the instruction completion, the comparison determining unit 67 determines whether there is the next printer 51 in step S107. When the comparison determining unit 67 determines that there is the next printer 51, the comparison determining unit 67 retrieves the operation mode information "printing mode" with respect to the printer 51c from the operation mode information table 33 (refer to FIG. 6(a)). Accordingly, the comparison determining unit 39 determines the set operation mode with respect to the printer 51c as "hibernation mode". Then, the comparison determining unit 67 compares the operation mode information "printing mode" with respect to the printer 51c with the set operation mode "hibernation mode" in step S103. Accordingly, the comparison determining unit 67 determines that the operation mode does not match to the set operation mode in step S104, the comparison determining unit 67 notifies the printer name "printer c" and the set operation mode "hibernation mode" to the instructing unit 68.

In order to instruct switching of the operation mode, the instructing unit 68 sends the printer name "printer c" and the set operation mode "hibernation mode" to the server control unit 69. In step S105, the server control unit 69 retrieves the IP address "192.168.11.zzz" corresponding to the printer name "printer c" thus received from the printer registration information unit 38 (refer to FIG. 4). Then, the server communication unit 61 sends the switch instruction signal to the printer 51c for switching to the power save mode according to the IP address thus retrieved. Afterward, the instructing unit 68 notifies the instruction completion to the comparison determining unit 67.

When the printer communication unit 59 receives the switch instruction signal from the administrative server 53, in the printer 51b, the switching unit 28 sends the instruction to the power supply unit 22 to switch the operation mode of the printer 51c from the printing mode to the hibernation mode. According to the instruction, the power supply unit 22 stops supplying power to the printing unit 21, i.e., the developing unit 25 and the fixing unit 26. Accordingly, the operation mode of the printer 51c is switched from the printing mode to the hibernation mode.

When the instruction completion is notified, in the administrative server 53, the comparison determining unit 67 determines whether there is the next printer 51 in step S107. When the comparison determining unit 67 determines that there is no next printer 51, the mode administration operation of the printing system 50 is completed.

As described above, in the embodiment, when one of the host devices 52 is in the operation state, after the set operation mode with respect to the one of the host device 52 is determined, the operation mode is switched.

In step S602, it is determined whether the operation host number is zero. In step S604, when it is determined that the operation host number is zero, the server control unit 69 determines that the set operation mode of each of the printers 51 is the hibernation mode, and notifies the set operation mode to the determination control unit 66. Then, the determination control unit 66 performs the process from step S103.

As described above, when all of the host devices 52 are not in the operation state, it is determined that all of the printers 51 are set to the hibernation mode.

A printing operation of the printing system 50 will be explained next. In the printing system 50, when a user of one of the host devices 52 operates the input unit 56 for requesting the printing operation, under the control of the host control unit 58, the host communication unit 57 sends the request to return the usable printer name together with the IP address of the host devices 52 to the administrative server 53.

According to the request to return from the host devices 52, the administrative server 53 refers to the operation mode information table 33, and notifies the printer name of the printer set in the printing mode to the host devices 52.

In the host devices 52, when the host communication unit 57 receives the printer name from the administrative server 53, under control of the host control unit 58, the display unit 55 displays a selection screen for selecting the printer 51 for the printing operation. In the selection screen, only the printer name of the usable printer 51 is displayed for the selection according to the notification from the administrative server 53. When the user operates the input unit 56 to select the printer name, the printer name is input to the host control unit 58, and the host communication unit 57 sends the printer name together with the print job and the IP address to the administrative server 53.

In the administrative server 53, when the server communication unit 61 receives the printer name, the print job, and the IP address, the IP address of the printer 51 is retrieved from the printer registration information unit 38, and the print job is sent according to the IP address. Further, the host name is retrieved from the host registration information storage unit 37, so that the host name together with the printer name and the date/time information obtained with the timer 41 are stored in the history storage unit 63.

In the printers 51, when the printer communication unit 59 receives the print job from the administrative server 53, the printing unit 21 performs the printing operation under the control of the printer control unit 60.

As described above, in the embodiment, the print job is sent to the printer 51 in the printing mode through the administrative server 53, thereby performing the printing operation. Further, the history information of the print job is stored in the administrative server 53.

As described above, in the printing system 50 in the embodiment, the print history of each of the host devices 52 is accumulated. According to the usage of each of the printers 51 of the host device 52, the operation mode of the printer 51 is switched. Accordingly, it is possible to administer the operation mode according to the actual usage, thereby making it possible to save energy and improve operability.

In the embodiments described above, the present invention is applied to the printing system including the printers as the printing apparatus, and is not limited thereto. The present invention is applicable to a multi-function product instead of the printer.

The disclosure of Japanese Patent Application No. 2008-187161, filed on Jul. 18, 2008, is incorporated in the application by reference.

While the invention has been explained with reference to the specific embodiments of the invention, the explanation is illustrative and the invention is limited only by the appended claims.

What is claimed is:

1. A printing system comprising:
a plurality of printing apparatus capable of operating a plurality of operation modes;
a plurality of host devices sharing the printing apparatus; and
an administrative server for administrating the printing apparatus and the host devices, said administrative server being connected to the printing apparatus and the host devices through a network, said administrative server being arranged to instruct the printing apparatus to operate one of the operation modes according to mode setting information,
wherein said administrative server includes:
a mode setting information storage unit for storing mode setting information in advance to set one of the operation modes with respect to each of the printing apparatus according to an operation host number indicating a number of the host devices in an operation state;
a number count obtaining unit for obtaining the operation host number according to operation information received from the host devices indicating whether the host devices are in the operation state; and
a determination control unit for controlling the printing apparatus to determine the mode setting information according to the operation host number, and to set the operation mode of each of the printing apparatus as a set operation mode according to the mode setting information.

2. The printing system according to claim 1, wherein said administrative server further includes an operation mode information storage unit for storing operation mode information indicating a previous operation mode of each of the printing apparatus according to apparatus identification information, said determination control unit including a comparison determining unit and an instruction updating unit, said comparison determining unit being arranged to compare the previous operation mode and the set operation mode to determine whether the previous operation mode matches to the set operation mode, said instruction updating unit being arranged to send a switching instruction to the printing apparatus for switching the operation mode, and to update the operation mode information storage unit according to the apparatus identification information and the set operation mode when it is determined that the previous operation mode does not match to the set operation mode, each of said printing apparatus including a switching unit for switching the operation mode according to the switching instruction.

3. The printing system according to claim 1, wherein each of said printing apparatus includes a fixing unit having a heater; a printer communication unit for communicating with the administrative server through the network; a power supply unit for supplying power to components including the heater and the printer communication unit; a supply control unit for controlling the power supply unit, each of said printing apparatus being arranged to perform one of a printing mode, a power save mode, and a hibernation mode, said supply control unit being arranged to control the power supply unit to supply power to the components when the printing apparatus performs the printing mode, said supply control unit being arranged to control the power supply unit to supply power to the components except the heater when the printing apparatus performs the power save mode, said supply control unit being arranged to control the power supply unit to supply power only to the printer communication unit when the printing apparatus performs the hibernation mode.

4. The printing system according to claim 1, where said number count obtaining unit is arranged to periodically obtain the operation information from the host devices.

5. The printing system according to claim 1, wherein said administrative server further includes a server communication unit for sending an obtaining request to the host devices for obtaining the operation information, and for receiving the operation information from the host devices, each of said host devices including a host communication unit for receiving the obtaining request from the administrative server and sending the operation information to the administrative server.

6. A printing system, comprising:
a plurality of printing apparatus capable of operating a plurality of operation modes;
a plurality of host devices sharing the printing apparatus; and
an administrative server for administrating the printing apparatus and the host devices, said administrative server being connected to the printing apparatus and the host devices through a network, said administrative server being arranged to instruct the printing apparatus to operate one of the operation modes according to mode setting information,
wherein said administrative server further includes a history storage unit for storing print history information from the host device, a judging unit for determining apparatus information of the host devices in an operation state, and a communication unit for sending a switching instruction to the printing apparatus for switching the operation mode according to a result of the judging unit, and
said administrative server further includes a determining unit for analyzing the print history information to determine at least one of the printing apparatus that the host device in the operation state uses most and used most recently, said communication unit sending the switching instruction to the printing apparatus according to a result of the determining unit.

7. A printing system, comprising:
a plurality of printing apparatus capable of operating plurality of operation modes;
a plurality of host devices sharing the printing apparatus; and
an administrative server for administrating the printing apparatus and the host devices, said administrative server being connected to the printing apparatus and the host devices through a network, said administrative server being arranged to instruct the printing apparatus to operate one of the operation modes according to mode setting information,
wherein said administrative server includes a usage storage unit for storing a usage of each of the printing apparatus in advance according to date/time information; a mode setting information storage unit for storing the mode setting information for setting the operation mode with respect to each of the printing apparatus according to the usage; a retrieving unit for obtaining current date/time information to retrieve the usage from the usage storage unit according to the date/time information; and a determination control unit for controlling the printing apparatus to determine the mode setting information according to the usage, and to set the operation mode of each of the printing apparatus as a set operation mode according to the mode setting information.

8. The printing system according to claim 7, wherein said administrative server further includes an operation mode information storage unit for storing operation mode information indicating a previous operation mode of each of the printing apparatus according to apparatus identification information, said determination control unit including a comparison determining unit and an instruction updating unit, said comparison determining unit being arranged to compare the previous operation mode and the set operation mode to determine whether the previous operation mode matches to the set operation mode, said instruction updating unit being arranged to send a switching instruction to the printing apparatus for switching the operation mode, and to update the operation mode information storage unit according to the apparatus identification information and the set operation mode when it is determined that the previous operation mode does not match to the set operation mode, each of said printing apparatus including a switching unit for switching the operation mode according to the switching instruction.

9. The printing system according to claim 7, wherein each of said printing apparatus includes a fixing unit having a heater; a printer communication unit for communicating with the administrative server through the network; a power supply unit for supplying power to components including the heater and the printer communication unit; a supply control unit for controlling the power supply unit, each of said printing apparatus being arranged to perform one of a printing mode, a power save mode, and a hibernation mode, said supply control unit being arranged to control the power supply unit to supply power to the components when the printing apparatus performs the printing mode, said supply control unit being arranged to control the power supply unit to supply power to the components except the heater when the printing apparatus performs the power save mode, said supply control unit being arranged to control the power supply unit to supply power only to the printer communication unit when the printing apparatus performs the hibernation mode.

10. The printing system according to claim 7, where said retrieving unit is arranged to periodically obtain the current date/time information and retrieve the usage.

11. The printing system according to claim 7, wherein each of said host devices includes a host communication unit for sending a print job to the administrative server, said administrative server further including an operation mode information storage unit for storing operation mode information indicating a previous operation mode of each of the printing apparatus, a date/time obtaining unit for obtaining date/time information indicating a date and a time when the print job is received from the host devices; a server communication unit for sending the print job to at least one of the printing apparatus selected according to the operation mode information; a history storage unit for storing a history as a combination of the date/time information and the apparatus identification information of the at least one of the printing apparatus; and a usage obtaining unit for obtaining the usage according to the history.

12. The printing system according to claim 11, wherein said usage obtaining unit is arranged to store a number of the print jobs as the usage.

13. The printing system according to claim 11, wherein said usage obtaining unit is arranged to store a total sum of the print jobs as the usage.

14. The printing system according to claim 11, wherein said history storage unit is arranged to store history information of each of the printing apparatus according to the apparatus identification information, said usage obtaining unit being arranged to obtain the usage of each of the printing apparatus according to the apparatus identification information.

15. The printing system according to claim 11, wherein said history storage unit is arranged to store history information of each of the host devices according to device identification information thereof, said usage obtaining unit being arranged to obtain operation information from the host device indicating whether the host devices are in an operation state, and to obtain the usage according to the operation information.

* * * * *